(12) United States Patent
Gaddam et al.

(10) Patent No.: US 7,675,994 B2
(45) Date of Patent: Mar. 9, 2010

(54) PACKET IDENTIFICATION MECHANISM AT THE TRANSMITTER AND RECEIVER FOR AN ENHANCED ATSC 8-VSB SYSTEM

(75) Inventors: Vasanth R. Gaddam, Ossining, NY (US); Dagnachew Birru, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 925 days.

(21) Appl. No.: 10/118,876

(22) Filed: Apr. 9, 2002

(65) Prior Publication Data

US 2002/0191712 A1 Dec. 19, 2002

Related U.S. Application Data

(60) Provisional application No. 60/295,616, filed on Jun. 4, 2001, provisional application No. 60/280,782, filed on Apr. 2, 2001.

(51) Int. Cl.
*H04L 27/04* (2006.01)
(52) U.S. Cl. ..................................... 375/301
(58) Field of Classification Search ................. 375/270, 375/301, 321; 332/170; 329/357; 455/47, 455/109, 204; 386/95, 111, 112; 348/423
See application file for complete search history.

(56) References Cited

U.S. PATENT DOCUMENTS

| | | | | |
|---|---|---|---|---|
| 5,508,748 | A | 4/1996 | Krishnamurthy et al. | .... 348/475 |
| 5,512,957 | A * | 4/1996 | Hulyalkar | .................. 348/607 |
| 5,619,269 | A * | 4/1997 | Lee et al. | ................ 375/240.01 |
| 6,081,650 | A * | 6/2000 | Lyons et al. | ................... 386/95 |
| 6,480,237 | B1 * | 11/2002 | Jun | ............................ 348/558 |
| 6,493,402 | B1 * | 12/2002 | Fimoff | ........................ 375/321 |
| 6,614,487 | B2 * | 9/2003 | Hong et al. | .................. 348/500 |
| 6,665,355 | B1 * | 12/2003 | Chen et al. | ................... 375/321 |
| 6,810,084 | B1 * | 10/2004 | Jun et al. | ............... 375/240.28 |
| 6,888,840 | B1 * | 5/2005 | Ramaswamy et al. | ....... 370/412 |
| 6,996,133 | B2 * | 2/2006 | Bretl et al. | ................... 370/535 |

FOREIGN PATENT DOCUMENTS

WO 0203678 A2 1/2002

OTHER PUBLICATIONS

"ATSC Digital Television Standard (Revision B), Aug. 7, 2001".
U.S. Appl. No. 10/078,933, filed Feb. 19, 2002.
U.S. Appl. No. 10/127,531, filed Apr. 22, 2002.

* cited by examiner

*Primary Examiner*—Khai Tran

(57) ABSTRACT

A flexible digital transmission system that improves upon the ATSC A/53 HDTV signal transmission standard. The system includes a digital signal transmitter for generating a first Advanced Television Systems Committee (ATSC) standard encoded 8-VSB bit stream and, for generating an encoded new robust bit stream for transmitting high priority information bits, wherein symbols of the new bit stream are capable of being transmitted according to a transmission mode including: a 2-VSB mode and a 4-VSB transmission mode. The standard 8-VSB bit stream and new bit stream may be simultaneously transmitted over a terrestrial channel according to a broadcaster defined bit-rate ratio. The transmission system includes a control mechanism for generating information needed for encoding robust packets at a transmitter device. It also includes a mechanism for encoding control parameters and multiplexes the generated information with the standard and robust bit-streams for transmission. A receiver architecture is additionally provided to decode standard and robust bit-streams transmitted by the transmitter device.

28 Claims, 11 Drawing Sheets

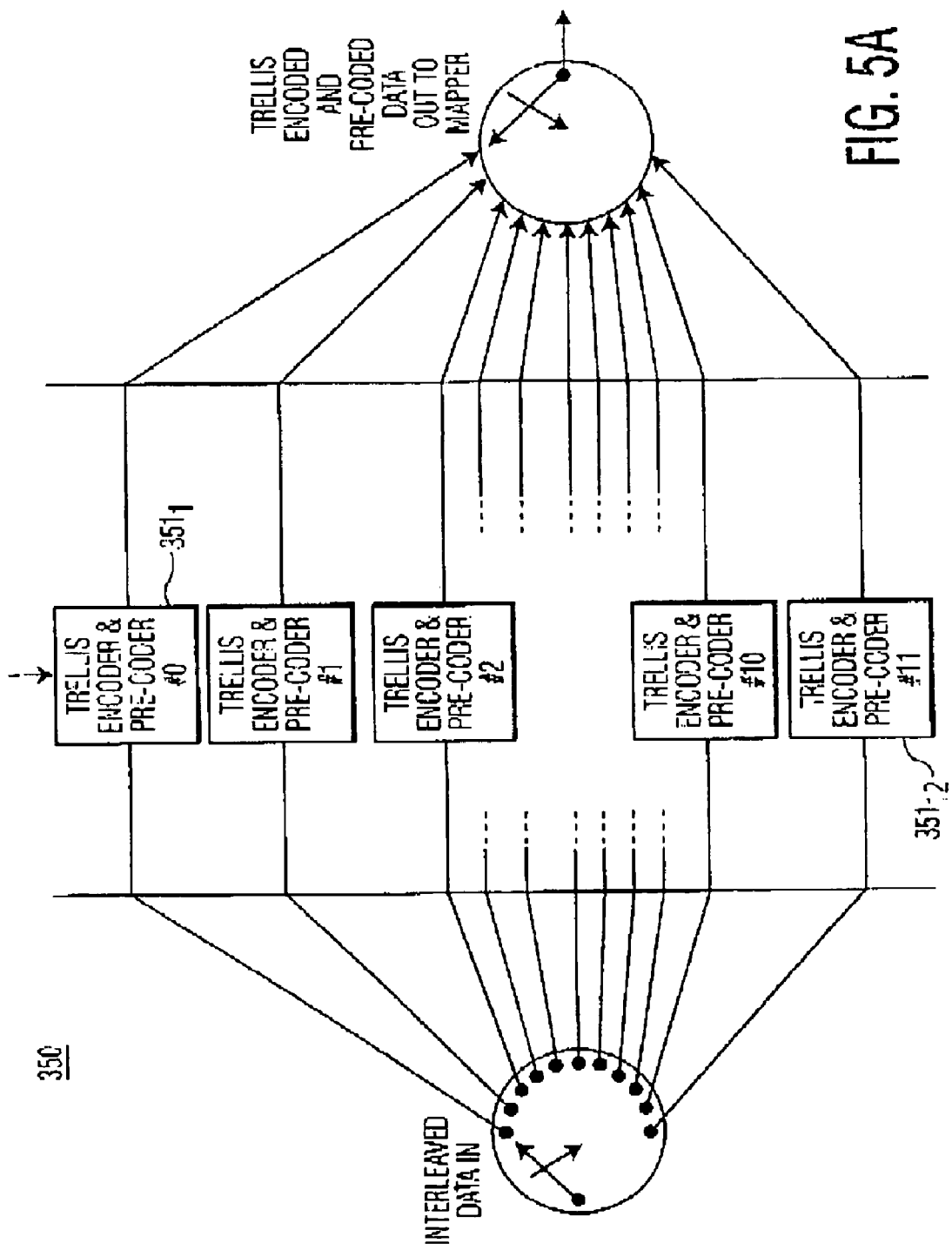

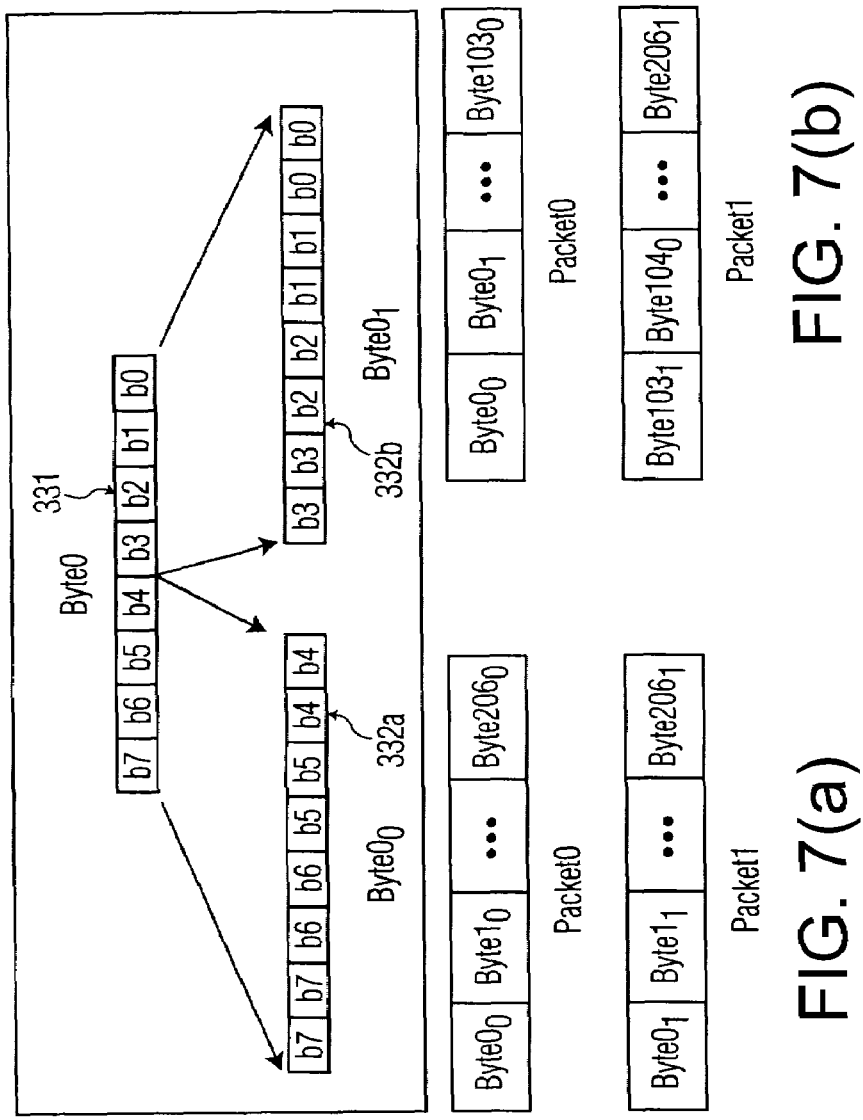

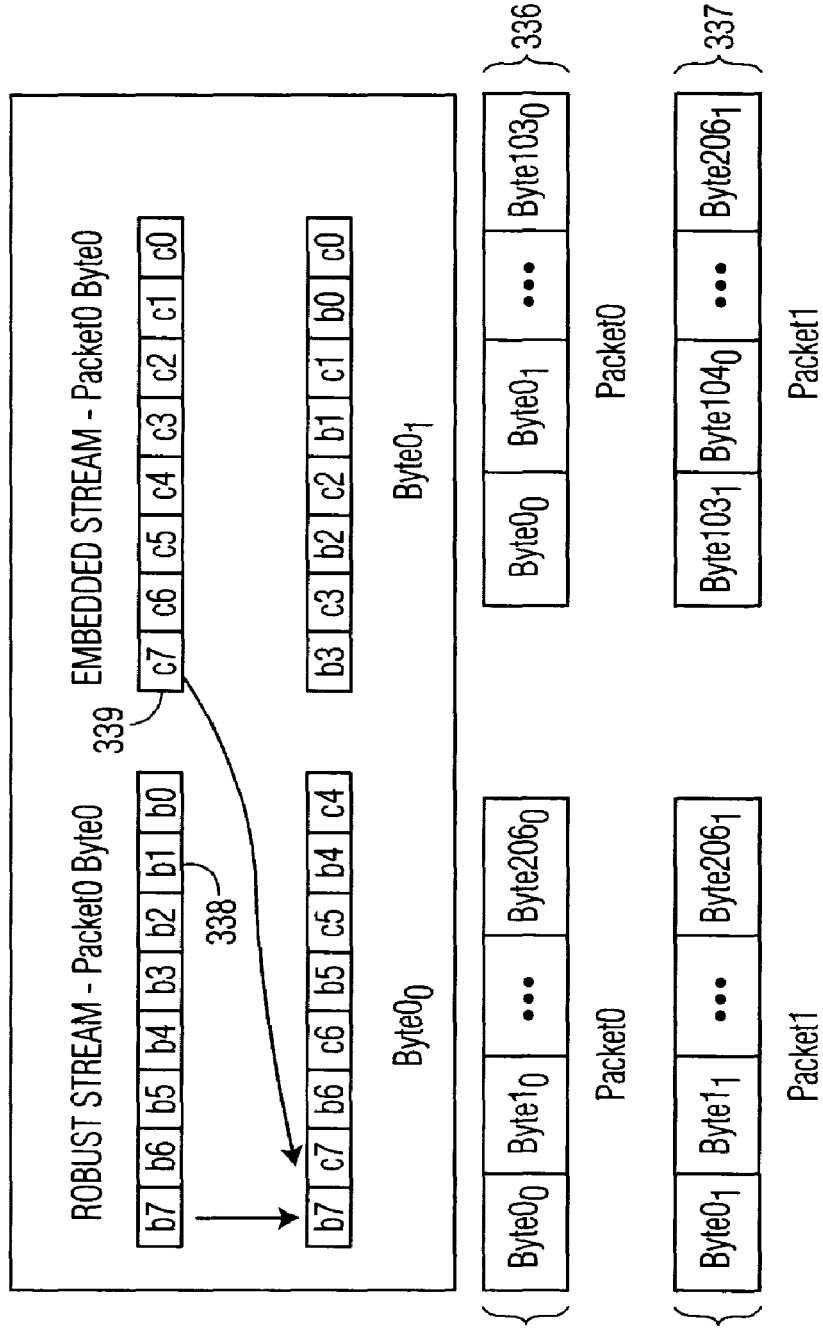

| PACKET 0 |
|---|
| PACKET 1 |
| PACKET 2 |
| PACKET 3 |
| PACKET 4 |
| PACKET 5 |
| ... |
| PACKET 41 |
| PACKET 42 |
| PACKET 43 |
| PACKET 44 |
| PACKET 45 |
| ... |
| PACKET 307 |
| PACKET 308 |
| PACKET 309 |
| PACKET 310 |
| PACKET 311 |

| PACKET 0 – ROBUST |
|---|
| PACKET 1 – STANDARD |
| PACKET 2 – STANDARD |
| PACKET 3 – STANDARD |
| PACKET 4 – ROBUST |
| PACKET 5 – STANDARD |
| ... |
| PACKET 41 – STANDARD |
| PACKET 42 – STANDARD |
| PACKET 43 – STANDARD |
| PACKET 44 – ROBUST |
| PACKET 45 – STANDARD |
| ... |
| PACKET 307 – STANDARD |
| PACKET 308 – ROBUST |
| PACKET 309 – STANDARD |
| PACKET 310 – STANDARD |
| PACKET 311 – STANDARD |

PACKET IDENTIFICATION MECHANISM AT THE TRANSMITTER AND RECEIVER FOR AN ENHANCED ATSC 8-VSB SYSTEM

CROSS-REFERENCE TO RELATED APPLICATION

The present invention claims the benefit of commonly-owned, U.S. Provisional Patent Application Ser. No. 60/295,616 filed Jun. 4, 2001. This patent application is additionally related to commonly-owned, U.S. Provisional Patent Application Ser. No. 60/280,782 filed Apr. 2, 2001 entitled IMPROVED ATSC DIGITAL TELEVISION SYSTEM, the entire contents and disclosure of which is incorporated by reference as if fully set forth herein.

BACKGROUND OF THE INVENTION

1. Field of the Invention

The present invention relates to digital transmission systems and particularly, to the Advanced Television Systems Committee (ATSC) Digital Television (DTV) standard (A/53). The invention describes a method for transmitting a robust bit-stream along with the standard bit-stream that is in compliance with the ATSC standard, an further describes a method for enabling identification of robust packets at a receiver device.

2. Discussion of the Prior Art

The ATSC standard for high-definition television (HDTV) transmission over terrestrial broadcast channels uses a signal that comprises a sequence of twelve (12) independent time-multiplexed trellis-coded data streams modulated as an eight (8) level vestigial sideband (VSB) symbol stream with a rate of 10.76 MHz. This signal is converted to a six (6) MHz frequency band that corresponds to a standard VHF or UHF terrestrial television channel, over which the signal is broadcast at a data rate of 19.39 million bits per second (Mbps). Details regarding the (ATSC) Digital Television Standard and the latest revision A/53 is available at http://www.atsc.org/.

FIG. 1 is a block diagram generally illustrating an exemplary prior art high definition television (HDTV) transmitter 100. MPEG compatible data packets are first randomized in a data randomizer 105 and each packet is encoded for forward error correction (FEC) by a Reed Solomon (RS) encoder unit 110. The data packets in successive segments of each data field are then interleaved by data interleaver 120, and the interleaved data packets are then further interleaved and encoded by trellis encoder unit 130. Trellis encoder unit 130 produces a stream of data symbols baying three (3) bits each. One of the three bits is pre-coded and the other two bits are produced by a four (4) state trellis encoder. The three (3) bits are then mapped to an 8-level symbol.

As known, a prior art trellis encoder unit 130 comprises twelve (12) parallel trellis encoder and pre-coder units to provide twelve interleaved coded data sequences. In multiplexer 140 the symbols of each trellis encoder unit are combined with "segment sync" and "field sync" synchronization bit sequences 150 from a synchronization unit (not shown). A small in-phase pilot signal is then inserted by pilot insertion unit 160 and optionally pre-equalized by filter device 165. The symbol stream is then subjected to vestigial sideband (VSB) suppressed carrier modulation by VSB modulator 170. The symbol stream is then finally up-converted to a radio frequency by radio frequency (RF) converter 180.

FIG. 2 is a block diagram illustrating an exemplary prior art high definition television (HDTV) receiver 200. The received RF signal is down-converted to an intermediate frequency (IF) by tuner 210. The signal is then filtered and converted to digital form by IF filter and detector 220. The detected signal is then in the form of a stream of data symbols that each signify a level in an eight (8) level constellation. The signal is then provided to NTSC rejection filter 230 and to synchronization unit 240. Then the signal is subjected to equalization and phase tracking by equalizer and phase tracker 250. The recovered encoded data symbols are then subjected to trellis decoding by trellis decoder unit 260. The decoded data symbols are then further de-interleaved by data de-interleaver 270. The data symbols are then subjected to Reed Solomon decoding by Reed Solomon decoder 280. This recovers the MPEG compatible data packets transmitted by transmitter 100.

While the existing ATSC 8-VSB A/53 digital television standard is sufficiently capable of transmitting signals that overcome numerous channel impairments such as ghosts, noise bursts, signal fades and interferences in a terrestrial setting, there exists a need for flexibility in the ATSC standard so that streams of varying priority and data rates may be accommodated.

It would thus be highly desirable to provide in an ATSC digital transmission system, a technique for transmitting new robust bit-streams along with the standard ATSC 8-VSB bit-stream, wherein the new bit-stream has a lower Threshold of Visibility (TOV) compared to the standard ATSC stream.

It would further be highly desirable to provide a flexible ATSC digital transmission system and methodology that provides a mechanism for transmitting defined parameters used to correctly identify robust packets at a receiver device.

It would further be highly desirable to provide a flexible ATSC digital transmission system and methodology that permits a trade-off of the standard bit-stream's data rate for the new bit-stream's robustness, and, further is such that the transmission is backward compatible with existing digital television receiver devices.

SUMMARY OF THE INVENTION

It is thus an object of the present invention to provide in an ATSC digital transmission system, a technique for transmitting a new robust bit-stream along with the standard ATSC bit-stream.

It is another object of the present invention to provide a flexible ATSC digital transmission system and methodology that provides a mechanism for generating and transmitting defined parameters used for correctly identifying robust packets at a receiver device.

It is a further object of the present invention to provide a flexible ATSC digital transmission system that is backward compatible with existing digital television receiver devices.

In accordance with the preferred embodiments of the invention, there is provided a digital signal transmission system and method comprising: a means for encoding packets to be transmitted as either 8-VSB modulated bit stream symbols or, encoding robust packets for transmission as robust bit stream symbols; a transmitter device for transmitting a robust bit-stream comprising the robust bit stream symbols separately, or in conjunction with a standard bit-stream comprising 8-VSB modulated bit stream symbols over a fixed bandwidth communications channel for receipt by a receiver device; and, a means for generating information needed for decoding robust packets at the receiver device, the transmitter device multiplexing the generated packet decoding information with the standard bit-stream and the robust bit-stream for enabling appropriate symbol decoding at the receiver device.

To insure backward compatibility with existing receivers from various manufacturers, an optional non-systematic Reed-Solomon encoder is provided to add parity bytes to the robust bit-stream packets. The standard 8-VSB bit-stream will be encoded using the ATSC FEC scheme (A/53). Packets transmitted using the inserted new bit-stream will be ignored by the transport layer decoder of the existing receiver, thus reducing the effective payload that can be decodable by existing receivers.

BRIEF DESCRIPTION OF THE DRAWINGS

Details of the invention disclosed herein shall be described below, with the aid of the figures listed below, in which:

FIG. 5(a) illustrates a trellis encoder block 350 employs trellis code intrasegment interleaving according to the prior art;

FIG. 7(a) depicts the process of packet duplication for packets formatted according to control parameter Mode=2,3 and for NRS=0, and FIG. 7(b) depicts the process of packet duplication for packets formatted according to control parameter Mode=2,3 and for NRS=1;

FIGS. 8(a) and 8(b) particularly depicts the bit rearrangement process performed by the packet formatter for control parameter MODE=1 and for NRS=0 (FIG. 8(a)) and for NRS=1 (FIG. 8(b));

DETAILED DESCRIPTION OF THE PREFERRED EMBODIMENTS

Co-pending, commonly-owned U.S. patent application Ser. No. 10/078,933, filed Feb. 19, 2002, now U.S. Pat. No. 7,206,352 entitled IMPROVED ATSC DIGITAL TELEVISION SYSTEM, the whole contents and disclosure of which is incorporated by reference as if fully set forth herein, describes a system that enables the transmission of more robust ATSC bit streams, e.g., those defined as pseudo 2-VSB and 4-VSB and hierarchical VSB or H-VSB modulated bit-streams, by a digital transmitter, or the embedding of robust bit streams in the standard ATSC 8-VSB bit stream. According to U.S. Pat. No. 7,206,352, each of the proposed new ATSC bit streams is robust ("Robust Streams") in the sense that the error correcting capacity of bits in the Robust Stream is greater than the error correcting capacity of bits in the standard ATSC 8-VSB bit stream.

Figure 3:
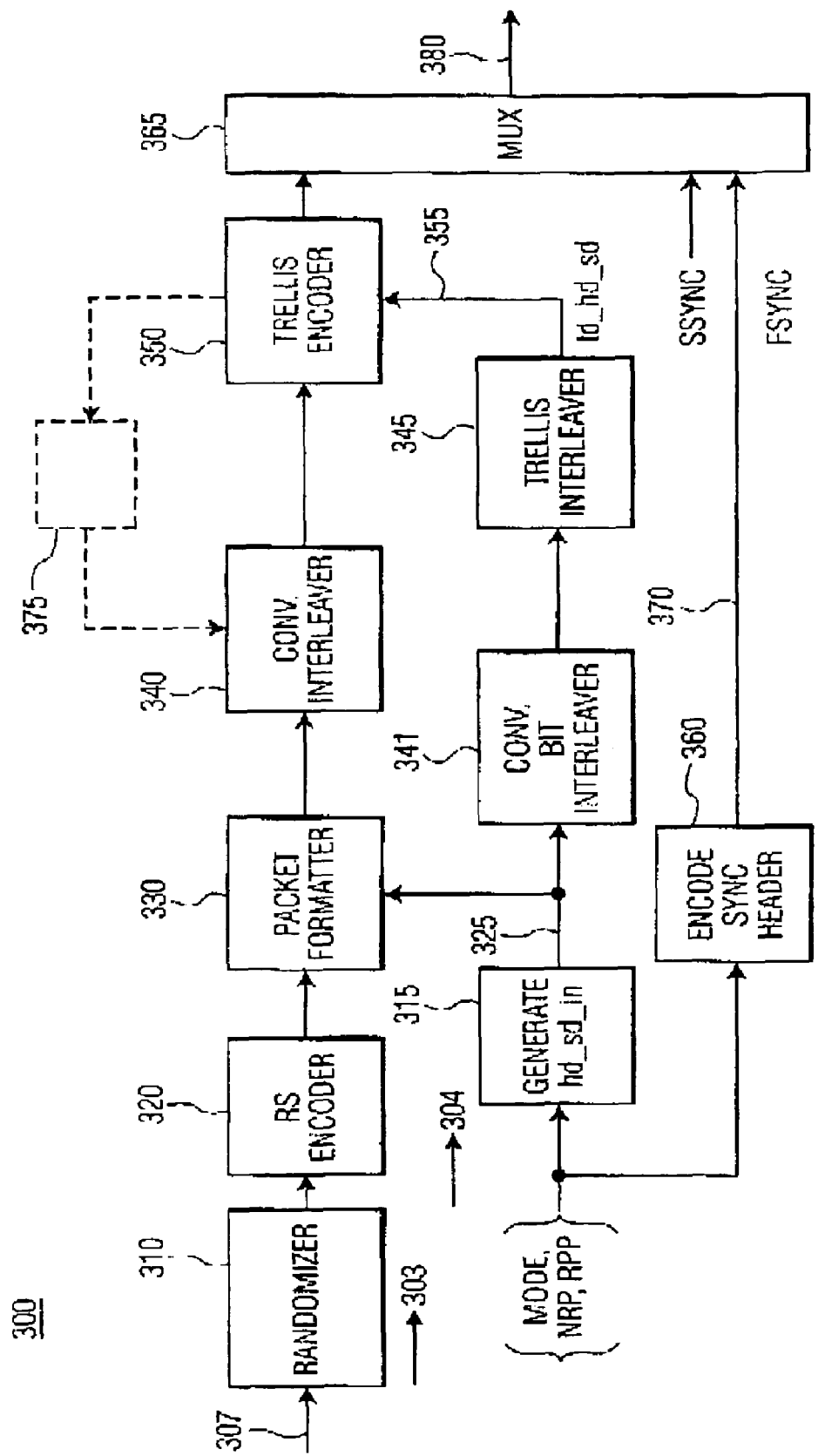
FIG. 3 is a representative functional diagram of the improved digital transmission system 300 for robust (pseudo 2-VSB and 4-VSB) and standard bit streams according to the invention.

The present invention herein described in accordance with FIG. 3 is directed to a novel digital transmission system 300 that enables the flexible transmission and receipt of MPEG compatible packets as robust and standard digital bit streams for accommodating a large range of carrier-to-noise ratios and channel conditions. Moreover, the present invention herein described relates to a digital transmission system implementing novel methods for enabling backward compatibility with existing digital receiver devices, and, specifically, providing a mechanism for transmitting defined parameters used to correctly identify robust MPEG packets at a receiver device.

A representative functional diagram of the improved digital transmission system 300 for transmitting robust pseudo 2-VSB or 4-VSB bit-streams (in addition to standard bit streams) according to the invention is now described with respect to FIG. 3. As shown in FIG. 3, the system 300 includes an input path 303 for receiving packets 307 and generating digital bit streams according to the existing ATSC 8-VSB standard or, as new (robust) pseudo 2-VSB, 4-VSB or H-VSB modulation bitstreams. Preferably, all robust packets, e.g., pseudo 2-VSB or 4-VSB modulated, are processed and transmitted by system 300 in a backward compatible manner, meaning that existing receivers will be able to identify the robust stream packets as valid RS (Reed-Solomon) codewords. It may do so, for instance, by enabling a packet identifier (PID) corresponding to the robust stream packets (for existing receivers) to comprise a Null packet header.

As described in U.S. Pat. No. 7,206,352, several feature points of the new ATSC encoding system include, but are not limited to: 1) the Threshold of Visibility (TOV) for the new robust stream may be as low as 8.5 dB; 2) enablement of significant performance gains for the new robust stream in the presence of strong static multi-path and dynamic multi-path; 3) permit a trade-off of data rates for robustness; 4) three different system modes: pseudo 2-VSB, 4-VSB, and Hierarchical VSB (H-VSB); 5) an optional Reed-Solomon encoder to satisfy backward compatibility requirements; 6) the broadcaster may choose the amount of mix of the robust stream and the standard stream. The mix percentage may range from 0% (standard stream only) to 100% (robust stream only); and, 7) several options are provided for the placement of robust packets within a frame.

Figure 4:
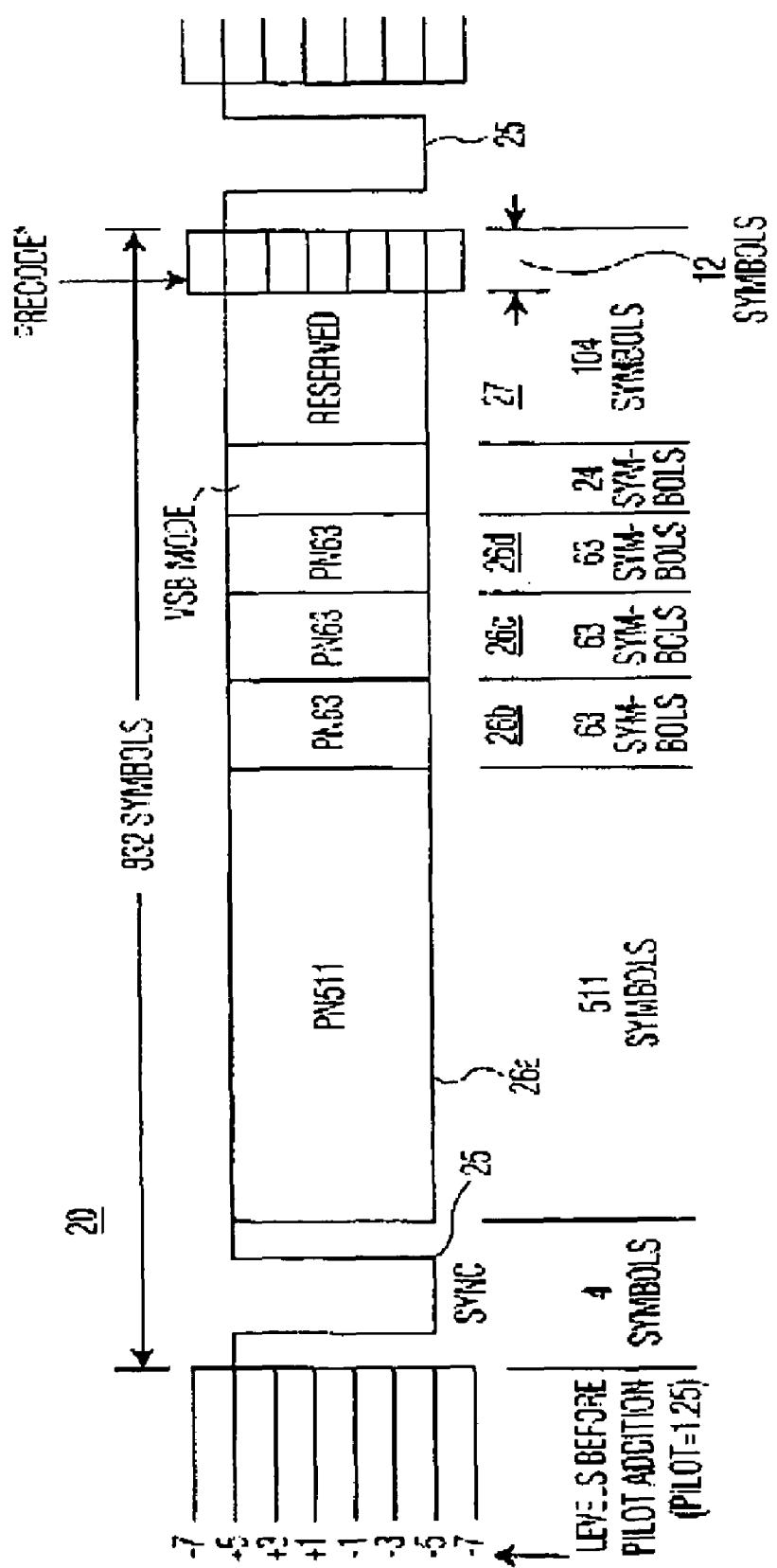
FIG. 4 is an illustration depicting a data segment comprising the FEC encoded bit streams transmitted by the improved digital transmission system 300 of the invention.

Thus, in order to implement the improved ATSC digital transmission system, a number of selectable parameters must first be chosen and transmitted to the receiver device. An efficient method for conveying this information to the receiver device is now herein described. Particularly, some of the reserved Frame Sync bits defined in accordance with the A/53 ATSC standard may be used for this purpose. As shown in FIG. 4, according to the ATSC A/53 standard, Revision B (Aug. 7, 2001), a VSB transmitter organizes data transmission as a series of data frames (not shown) with each data frame comprising two data fields, each data field comprising 313 data segments. Each Data Field is periodic (approximately 24.2 ms) and starts with one complete Data Segment referred to as a Data Field Sync (not shown) which is a unique synchronizing signal. The remaining 312 data segments each carry the equivalent of data from one 188-byte transport packet plus its associated forward error correction (FEC) overhead (generated by the RS coder and the trellis coder). A data field sync segment 20 is illustrated in FIG. 4 which comprises 832 symbols including a Data Segment Sync 25 signal which comprises four (4) symbols transmitted in binary form and provides segment synchronization. According to the ATSC A/53 standard, the remaining 828 symbols of the data segment 20 comprises several symbol fields including pseudo-noise sequences 26a, . . . , 26d of varying lengths, and, a reserved symbol field 27 comprising 104 symbols. According to the invention, it is within this reserved symbol field 27 where the set of parameters for identifying the type of digital bit-stream transmission, including standard and new robust (pseudo 2-VSB, 4-VSB and H-VSB) bit-streams in the backward compatible manner, for a receiver are communicated.

Table 1 indicates the parameters that have to be defined in order to correctly identify robust packets at a receiver. As these have to be interpreted at an equalizer device of the receiver, they are heavily protected using robust error correcting codes. The encoded code-word is preferably inserted in the 104 reserved symbol field 27 of a Data Field Sync segment 20.

TABLE 1

| MODE | NRS | NRP | RPP |
|---|---|---|---|
| (2) | (1) | (4) | (2) |

Table 1 particularly indicates the use of four parameters (and their respective number of bits) to identify robust packets. A first parameter "MODE" includes specification of the robust packets and is used in identifying the format of the robust packets. Two bits are used to identify four possible modes as now described with respect to Table 2:

TABLE 2

| MODE | Description |
|---|---|
| 00 | Standard. No robust packets in the field |
| 01 | H-VSB mode |
| 10 | 4-VSB mode |
| 11 | Pseudo 2-VSB mode |

For instance, as shown in Table 2, the MODE 00 indicates a standard stream with no robust packets to be transmitted; MODE 01 indicates an H-VSB stream; MODE 10 indicates an 4-VSB stream; and MODE 11 indicates a pseudo 2-VSB stream is to be transmitted. If MODE=00 then rest of the parameters may be ignored.

Referring back to Table 1, the second "NRS" (Non-systematic Reed-Solomon coder) parameter indicates whether the non-systematic RS coder is to be used to encode the robust packets. A single bit is used to identify the two possible NRS modes as now described with respect to Table 3:

TABLE 3

| NRS | Description |
|---|---|
| 0 | Non-systematic RS coder is not used |
| 1 | Non-systematic RS coder is used |

For instance, NRS=0, indicates that the non-systematic RS coder is not used and so one robust packet will be coded into two symbol segments by the FEC block. If NRS=1, then that indicates that the systematic RS coder is used and therefore a group of four robust packets will be coded into nine symbol segments by the FEC block. Tables 4 and 5 illustrate example ratios of the number of robust packets per frame (i.e., the number of Robust packets vs. the number of standard packets, per frame (mix) and, example corresponding bit-rates for NRS=0 and NRS=1, respectively.

TABLE 4

| # of Robust/# of standard packets, per frame (mix) | Bit Rate | |
|---|---|---|
| | Robust | Standard |
| 0/312 (0%) | 0 | 19.28 |
| 2/308 | 123.589 Kbps | 19.033 Mbps |
| 3/306 (2%) | 185.385 Kbps | 18.909 Mbps |
| 4/304 | 247.179 Kbps | 18.785 Mbps |
| 6/300 | 370.769 Kbps | 18.538 Mbps |
| 8/296 (5%) | 484.359 Kbps | 18.291 Mbps |
| 12/288 | 741.538 Kbps | 17.797 Mbps |
| 16/280 (10%) | 988.718 Kbps | 17.302 Mbps |
| 20/272 (13%) | 1.236 Mbps | 16.808 Mbps |
| 26/260 (16%) | 1.606 Mbps | 16.067 Mbps |
| 32/248 (20%) | 1.977 Mbps | 15.325 Mbps |
| 39/234 (25%) | 2.410 Mbps | 14.460 Mbps |
| 52/208 (33%) | 3.213 Mbps | 12.853 Mbps |
| 78/156 (50%) | 4.820 Mbps | 9.640 Mbps |
| 104/104 (66%) | 6.427 Mbps | 6.427 Mbps |
| 156/0 (100%) | 9.640 Mbps | 0 |

Table 4 particularly indicates the bit-rates of the respective robust and the standard bit-streams for different mix values, when NRS=0. It should be noted that the mix percentages indicated in Table 4 are rounded off values.

TABLE 5

| # of Robust/# of Standard packets, per frame | Bit Rate | |
|---|---|---|
| | Robust | Standard |
| 0/312 | 0 | 19.28 Mbps |
| 4/303 | 247.179 Kbps | 18.724 Mbps |
| 8/294 | 484.359 Kbps | 18.168 Mbps |
| 12/285 | 741.538 Kbps | 17.612 Mbps |
| 16/276 | 988.718 Kbps | 17.055 Mbps |
| 20/267 | 1.236 Mbps | 16.499 Mbps |
| 24/258 | 1.483 Mbps | 15.943 Mbps |
| 28/249 | 1.730 Mbps | 15.387 Mbps |
| 32/240 | 1.977 Mbps | 14.831 Mbps |
| 40/222 | 2.472 Mbps | 13.718 Mbps |
| 52/195 | 3.213 Mbps | 12.050 Mbps |
| 64/168 | 3.955 Mbps | 10.382 Mbps |
| 72/150 | 4.449 Mbps | 9.269 Mbps |
| 76/141 | 4.696 Mbps | 8.713 Mbps |
| 96/96 | 5.932 Mbps | 5.932 Mbps |
| 120/42 | 7.415 Mbps | 2.595 Mbps |

Table 5 particularly indicates the bit-rates of the robust and the standard bit-streams for different mix values when NRS=1.

Referring back to Table 1, the third "NRP" parameter indicates the Number of Robust Packets in a frame. Table 6 may be used to map this 4 bit number to the number of robust packets in a frame.

TABLE 6

| NRP | Number of robust packets before encoding | |
|---|---|---|
| | NRS = 0 | NRS = 1 |
| 0000 | 0 | 0 |
| 0001 | 2 | 4 |
| 0010 | 3 | 8 |
| 0011 | 4 | 12 |
| 0100 | 6 | 16 |
| 0101 | 8 | 20 |
| 0110 | 12 | 24 |
| 0111 | 16 | 28 |
| 1000 | 20 | 32 |
| 1001 | 26 | 40 |
| 1010 | 32 | 52 |
| 1011 | 39 | 64 |
| 1100 | 52 | 72 |
| 1101 | 78 | 76 |
| 1110 | 104 | 96 |
| 1111 | 156 | 120 |

Referring back to Table 1, the fourth "RPP" parameter indicates the Robust Packets' Position in a frame. Robust packets may be either distributed uniformly within a frame or arranged contiguously within a frame starting from an initial position. Note that uniform distribution is not possible for all values of NRP. Table 7 describes the various types of robust packet distributions within a frame.

TABLE 7

| RPP | Robust packets' position |
|---|---|
| 00 | Distributed uniformly within a frame with a granularity of one |
| 01 | Distributed uniformly within a frame with a granularity of two |
| 10 | Distributed uniformly within a frame with a granularity of four |
| 11 | Arranged contiguously within a frame starting from position one |

As described herein, robust symbol mapping techniques are utilized to get performance advantage for the new robust bit-stream. This necessitates a control mechanism to track bytes belonging to the robust bit-stream and the standard bit-stream through the FEC section of the transmitter. The transmitter also implements the 'Packet Formatter' block 330 (FIG. 3) in the data-path to re-format data bytes belonging the robust bit-stream, as will be explained in greater detail.

FIG. 3 is a block diagram depicting the ATSC transmitter 300 for transmitting robust bit streams according to the invention. For purposes of description, the ATSC transmitter 300 is described without the non-systematic RS coder (i.e., NRS=0). It is understood that a further embodiment of the ATSC transmitter that includes the optional non-systematic RS coder (i.e., NRS=1), is modified to take into account the additional complexity. As shown in FIG. 3, the ATSC transmitter 300 according to the invention implements a randomizer element 310 for first changing the input data byte value according to a known pattern of pseudo-random number generation. According to the ATSC standard, the data randomizer XORs all the incoming data bytes with a 16-bit maximum length pseudo random binary sequence (PRBS) which is initialized at the beginning of a data field. The output randomized data is then input to an Reed Solomon (RS) encoder element 320 which operates on a data block size of 187 bytes, and adds twenty (20) RS parity bytes for error correction to result in a RS block size total of 207 bytes transmitted per data segment. It is these bytes that will then be post processed and sent using robust constellations. After the RS encoding, the 207 byte data segment is then input to the packet formatter 330 which functions to re-format the data bytes belonging to the robust bit-stream accordingly. The packet formatter 330 essentially buffers and groups the incoming robust bit-strewn into groups of 207 bytes and passes the standard bit-stream bytes without any modification. In general, only 4 bits of each byte at the packet formatter output, the LSBs (6,4,2,0), correspond to the incoming stream. The other 4 bits of each byte, the MSBs (7,5,3,1), may be set to any value for reasons as will be explained in greater detail herein. After byte re-formatting in the packet formatter 330, the data is input to the convolutional interleaver mechanism 340 for scrambling the sequential order of the data stream according to the ATSC A/53 standard. As will be explained in greater detail, the tracking of bytes associated with each robust packet or standard packet is performed in a concurrent processing control path 304 as shown in FIG. 3. As further shown in FIG. 3, the interleaved, RS-encoded data bytes are then trellis coded by the trellis encoder device 350 which employs ⅔ rate trellis code with one unencoded bit which is precoded, i.e., one input bit is encoded into two output bits using a ½ rate convolutional code while the other bit is precoded. As shown in FIG. 5(*a*), the trellis encoder 350 employs trellis code intrasegment interleaving and symbol mapping, and comprises, for example, twelve identical trellis encoders and precoders $351_1$ to $311_{12}$ operating on interleaved data symbols.

Preferably, a more robust trellis encode mapping scheme (pseudo 2-VSB or 4-VSB) system is implemented for tracked robust symbols as compared to the standard 8-VSB symbol mapping scheme that is implemented for tracked normal (standard) symbols. It should be understood that for the trellis encoding of robust symbols, a ⅓ trellis encoding is implemented such that one bit of input is mapped into three bits which is mapped into one symbol for robust streams. For standard streams, two bits are mapped into three bits according to the conventional 8-level symbol mapping technique for standard packets. For conventional bytes belonging to the standard stream (SS), all 8-bits of each byte carry information. For the robust stream (NS), it is desirable that only four bits of each byte carry information. More particularly, as shown in FIG. 5(*b*), according to the invention, for the robust bit-stream, the trellis encoder 350 receives a byte, of which only 4-bits (LSBs) contain valid information. When a byte that belongs to the robust stream is received by the trellis encoder 350, the information bits (e.g., LSBs bits (6,4,2,0)) are placed on X1, and X2 is subsequently determined to obtain the particular symbol mapping scheme, e.g., pseudo 2-VSB. Once X2 is determined, the 4-MSBs of the byte, e.g., bits (7,5,3,1) will be replaced by these values. When all the bits of a byte are determined, a new byte will then have been formed containing the LSBs and the MSBs. This byte may then be passed to the "non-systematic" Reed-Solomon encoder 375 when NRS=1. As described in greater detail in U.S. Pat. No. 7,206,352, the parity bytes of the "non-systematic" Reed-Solomon encoder and the PID bytes will however be encoded using the 8-VSB encoding scheme. The symbol mapping techniques for each mode are now described as follows:

Pseudo 2-VSB Mode

The 2-VSB mode is obtained by making Z2 and Z1 equal to the information bit X1 (i.e., LSB bits (6,4,2,0)) in the trellis encoder unit 352 of FIG. 5(*b*). The X2 is then calculated such that, when precoded, it results in Z2. This operation is nothing other than X2=X1+Y2d mod 2, where Y2d is the content of the register 356 of the pre-coder unit 353 of FIG. 5(*b*). This operation, combined with the existing symbol mapping scheme implemented at the 8-level symbol mapper 354, results in symbols from the alphabet {−7,−5,5,7}. This is essentially a pseudo 2-VSB signal in the sense that the information bit is transmitted as the sign of this symbol. The actual symbol is a valid trellis coded 4-level symbol which can be decoded by existing trellis decoder devices.

4-VSB Mode

Figure 5B:
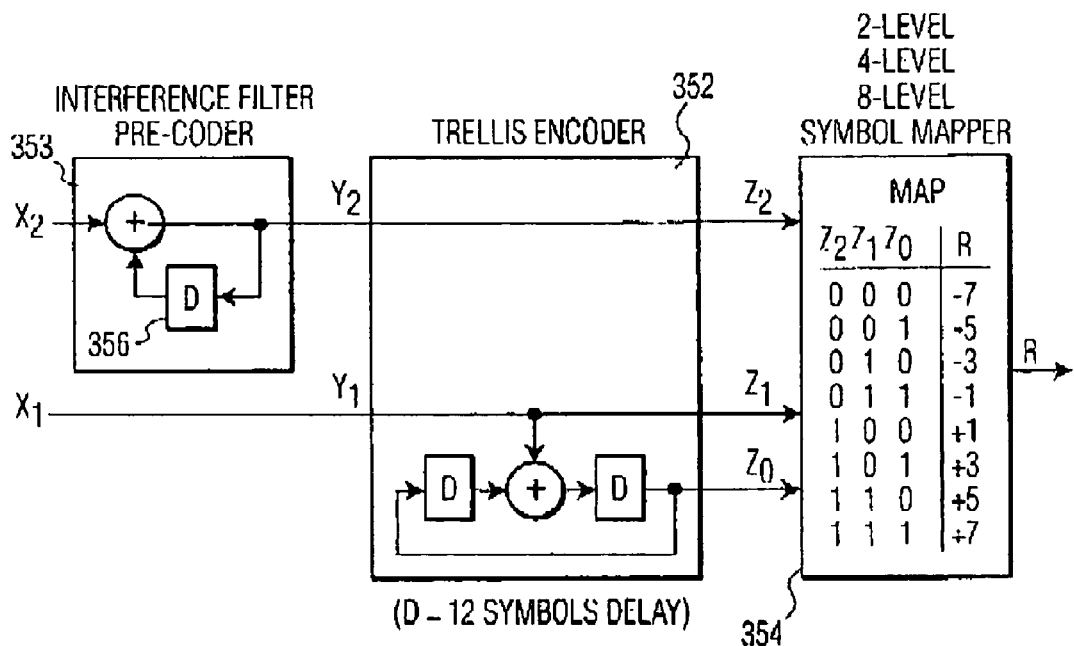
FIG. 5(b) illustrates a block diagram of one exemplary prior art trellis encoder and pre-coder unit (one of twelve such units shown in FIG. 5(a) and an eight (8) level symbol mapper; and, FIG. 6 illustrates the result of a packet duplication process implemented in the packet formatter device for robust streams.

In view of FIG. 5(b), the 4-VSB mode is obtained by making Z1 equal to the information bit in the trellis encoder unit 352. The X2 is then calculated such that when pre-coded, Z2 equals Z0. This operation is nothing other than X2=Z0+Y2d mod 2, where Y2d is the content of the pre-coder register 356. These operation and the use of the existing symbol mapping results in symbols from the alphabet {−7,−3,3,7} which is essentially a trellis coded 4-VSB symbol. The actual 4-level symbol is a valid trellis coded symbol that can be decoded by existing trellis decoders.

Figure 6:
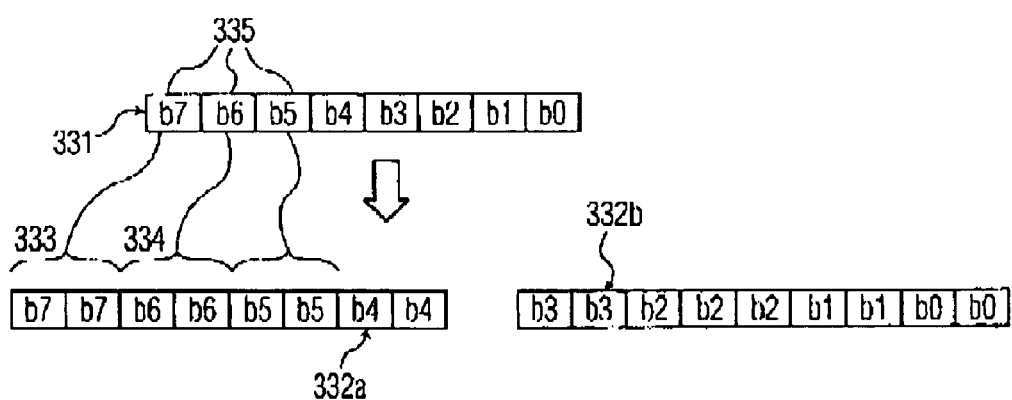

Thus, according to the invention, packets are formatted such that only the information is placed at the bit location suitable for processing by the trellis encoder. For robust streams, the information bit need only be placed in the robust byte at the desirable bit position for robust trellis encoding and symbol mapping. With greater particularity, at the MPEG packet level, for each robust packet carrying information, two packets are generated: one being the information carrier packet, and the other functioning as a placeholder packet. In the packet formatter 330, only the information carrier packet (not the placeholder packet) is processed. Particularly as shown in FIG. 6, the packet formatter generates two robust bytes (packets) 332a, 332b for each byte 331 of each packet received from the robust stream. The packet formatter 330 will generate two identical bits, e.g., bits 333, 334 corresponding to each information bit 335 of each input byte processed. That is, every two bits 333, 334 of each byte 332a, 332b corresponds to the information carrying bits 335 for input to the trellis encoder as the X1 and X2 bits, e.g., when pseudo 2-VSB mapping is employed (Z2=Z1) as shown in FIG. 5(b). Thus, the robust packet formatter ensures that the information bits is provided at the desired bit position X1, X2 for appropriate robust mapping at the trellis encoder 352 for forming the Z0-Z2 inputs in accordance with the desired robust symbol mapping scheme employed.

Referring back to FIG. 3, if the "non-systematic" Reed-Solomon encoder 375 is used, then only 187 bytes will be created to carry 4*187 bits of the robust stream. The remaining 20 bytes will be determined after these 187 bytes are trellis coded in a fashion to obtain (pseudo) 2-VSB and 4-VSB symbols. In creating the 207 bytes, the 187 bytes containing the information stream and the other 20 bytes, the specific values of which are at this processing stage yet to be determined, are permuted in such a way that after the data interleaver 340, these 20 bytes will appear at the end of the 187 bytes. At this new stream processing stage, the values of the 20 bytes can be set to any value. If, however, the "non-systematic" Reed-Solomon encoder 375 is not used, then all the LSBs of the 207 bytes will correspond to 207*4 bits from the incoming robust bit-stream. In this case, the 187-byte MPEG compliant packet will be transmitted using 828*2 symbols.

Table 8 summarizes the packet formatter 330 functionality for different combinations of the MODE and the NRS parameters.

TABLE 8

| NRS | MODE | Number of input packets | Number of output packets | Functionality |
|---|---|---|---|---|
| 0 | 2, 3 | 1 | 2 | Byte duplication |
| 0 | 1 | 2 | 2 | Rearrange bits |
| 1 | 2, 3 | 4 | 9 | Byte duplication, Insert "place holders" |
| 1 | 1 | 8 | 9 | Rearrange bits, Insert "place holders" |

In view of Table 8, the packet formatter 330 comprises three functional units: a basic formatter unit, parity byte location calculator unit and 'place holder' inserter unit. For instance, when NRS=0, it transforms each robust information byte 331 into two bytes 332a, 332b. This is depicted in FIG. 7(a) whereby a robust information packet input is transformed into two packets when NRS=0. The packet formatter's functionality particularly depends on the MODE and NRS control parameters. If NRS=0, then the packet formatter basically performs the function of byte duplication or byte rearrangement, as depicted in FIG. 7(a). However, if NRS=1 (i.e., non-systematic RS-encoding is employed for backwards compatibility at existing receiver devices) then, the packet formatter additionally inserts 'place holders' for the additional header and parity bytes. A more detailed discussion regarding the parity byte 'place holder' insertion mechanism is described in commonly-owned, co-pending U.S. patent application Ser. No. 10/127,531, filed Apr. 22, 2002, now U.S. Pat. No. 7,111,221, the whole contents and disclosure of which is incorporated by reference as if fully set forth herein.

As mentioned, the basic packet formatter function duplicates the bytes of a packet, as now shown in FIG. 7(a), if MODE=2 or 3 (4-VSB, pseudo 2-VSB), NRS=0 and, in FIG. 7(b), for the case when MODE=2 or 3 (4-VSB, pseudo 2-VSB) and NRS=1. If MODE=1 (H-VSB modulation employed), the bits of the input packet are rearranged as shown in FIGS. 8(a) and 8(b).

As shown in FIGS. 8(a) and 8(b), rearranging of bits is performed in H-VSB mode (MODE=1) to ensure that the 'robust stream' bits from a robust packet 338 always go into MSB bit positions and the 'embedded stream' bits from embedded packet 339 always go into LSB bit positions of the reformatted packets 336, 337, respectively. FIGS. 8(a) and 8(b) particularly depicts the bit rearrangement process performed by the packet formatter for control parameters MODE=1 and NRS=0 (FIG. 8(a)) and, for MODE=1, NRS=1 (FIG. 8(b)) when non-systematic RS-encoding is employed for backwards compatibility.

In sum, the input to the transmission subsystem from the transport subsystem is a 19.39 Mbps serial data stream comprising 188-byte MPEG compatible data packets. These MPEG packets are organized as groups of 312 packets to comprise a single MPEG field 400 as shown in FIG. 9(a). Each packet is classified as belonging to either a standard or robust bit-stream depending on the control information (MODE, NRP and RPP). For instance, the parameters NRP and RPP determine which packets in the group of 312 packets (MPEG field) belong to the robust bit-stream. NRS as defined above in Table 6 determines the number of robust packets in an MPEG field, while RPP (Table 7) identifies the position of robust packets within that field. The MODE parameter is used by the trellis encoder for encoding robust packets. It should be understood that the above condition implies that the control parameters may be changed only every 312 packets (i.e. once for each MPEG field).

Providing a processing example at the transmitter system 300, if mode parameters NRP="1011" and RPP="00" and NRS=0, are received, then, from Table 6, it may be determined that there are 78 robust packets (39*2 after encoding) in an MPEG field, for this value of NRP. RPP="00" indicates that these packets are distributed uniformly in an MPEG field starting with the first packet. The spacing between the robust packets is determined by the factor (312/78). So, for these set of parameters every fourth packet in an MPEG field starting from the first packet is a robust packet. It has to be noted that because of the additional processing done for robust packets, only some of them (50% for NRS=0), actually carry payload while the remaining robust packets are place-holders. FIG. 9(b) illustrates an example MPEG field 402 for NRP="1101" and RPP="00".

Figure 9C:
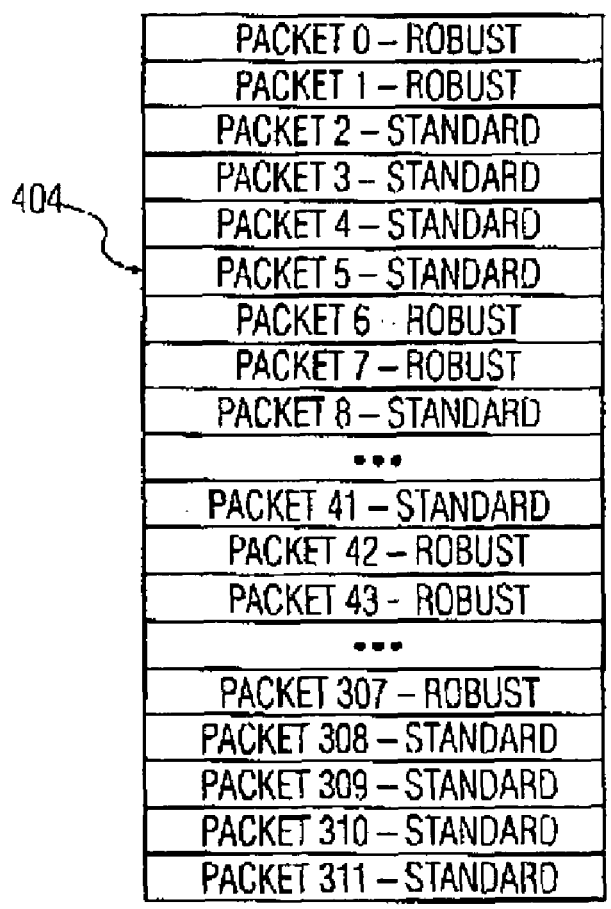
FIG. 9(a) illustrates a single MPEG field 400 comprising 312 packets.
FIG. 9(b) illustrates an example MPEG field 402 for the case when control parameter information includes NRP="1101" and RPP="00"; and, FIG. 9(c) illustrates an example MPEG field for the case when control parameters NRP="1100" and RPP="01"; and, FIG. 10 illustrates a block diagram of a novel ATSC receiver 500 capable of decoding both the standard and new (robust) bit-streams.

In another processing example, with NRP="1100" and RPP="01", from Table 6, it is determined that there are 52 robust packets in a group of 312 packets, for this value of NRP. With an RPP value of "01", this indicates that these packets are distributed uniformly in an MPEG field with a granularity of two (2) starting with the first packet. The spacing between the robust packet pairs is determined by the factor (312/2*52). So, for this set of parameters two packets every six packets in an MPEG field 404 starting from the first packet are robust packets. FIG. 9(c) illustrates an example MPEG field 404 for NRP="1100" and RPP="01".

As mentioned, in a concurrent processing path 304, the MODE, NRP and RPP parameters associated with each group of 312 packets of a received MPEG field is implemented for robust packet identification. As such, the control parameters the MODE, NRP and RPP parameters may only be changed every 312 packets, i.e., one MPEG field. In system operation, the parameters are particularly input to a Generate 'hd_sd_in' processing block 315 which implements logic for generating control information at the packet level based on MODE, NRP and RPP parameters. As described, the output 325 of this block is a bit value (e.g., '1') if the packet currently being processed belongs to the new robust stream (NS) or, is another bit value (e.g., '0'), if the packet received belongs to the standard stream (SS). More specifically, the output 325 of the Generate 'hd_sd_in' processing block 315 generates a bit for each byte present in each packet of the current MPEG field, e.g., 312 packets. Once the hd_sd generation block 315 identifies each packet, it will output a '1' for each robust byte and a '0' for each standard byte.

Preferably, according to this scheme, the coding gain is obtained by using different trellis encoding schemes for bytes belonging to different bit-streams. However, as the bytes of the bit-streams are rearranged by the data interleaver 340 and trellis interleaver 350 (of FIG. 5(a)) corresponding tracking bits 325 generated by block 315 are accordingly rearranged by the convolutional bit interleaver 341 and by the trellis interleaver blocks 345 by the time they are encoded by the trellis coder 350. The convolutional bit interleaver block 341 is similar in function to the convolutional byte interleaver 340 specified in the ATSC A/53 standard, except that the memory element is 1 bit instead of 1 byte. This block is used to track bytes through the convolutional interleaver 340. That is, in a synchronized fashion, each interleaved byte output from the convolutional interleaver block 340 is tracked by the convolutional bit interleaver 341 so that the integrity of the tracking bits in the control path 304 that correspond to each of the bytes to be transmitted, is preserved.

As mentioned, according to the ATSC standard, a further block, the trellis encoder 350 implements twelve identical trellis encoders employing intrasegment interleaving, thus further affecting the order of the symbols in the output stream. In order to continue identifying the bytes in the trellis encoder 350, a trellis interleaver control block 345 is provided so that each input to each trellis encoder is tracked. Tracking of information bytes through the control path 304 results in the generation of a 'td_hd_sd' bit associated with each symbol which identifies the symbol at the trellis encoder 350. Depending on this bit, the trellis encoder 350 uses either robust encoding or standard encoding in the manner as explained in greater detail herein. For example, the output 'td_hd_sd' 355 of control block 345 is equal to 1 when the trellis encoder output symbol belongs to a new (robust) stream (NS) and, is equal to 0 when the output symbol belongs to the standard stream (SS). The trellis encoder uses this information during symbol mapping. More particularly, each 'td_hd_sd' output 355 corresponds to a symbol generated at each of the twelve trellis encoders. The trellis interleaver block 345 thus tracks the corresponding symbols (robust or standard) output of the trellis encoder, and not bytes as in the other control blocks of processing path 304. It should be understood that, in view of FIG. 3, in accordance with the 'td_hd_sd' output 355 indicating symbols belonging to robust or normal (standard) packets, the trellis encoder 350 will map the symbols according to the associated modulation schemes.

Figure 1:
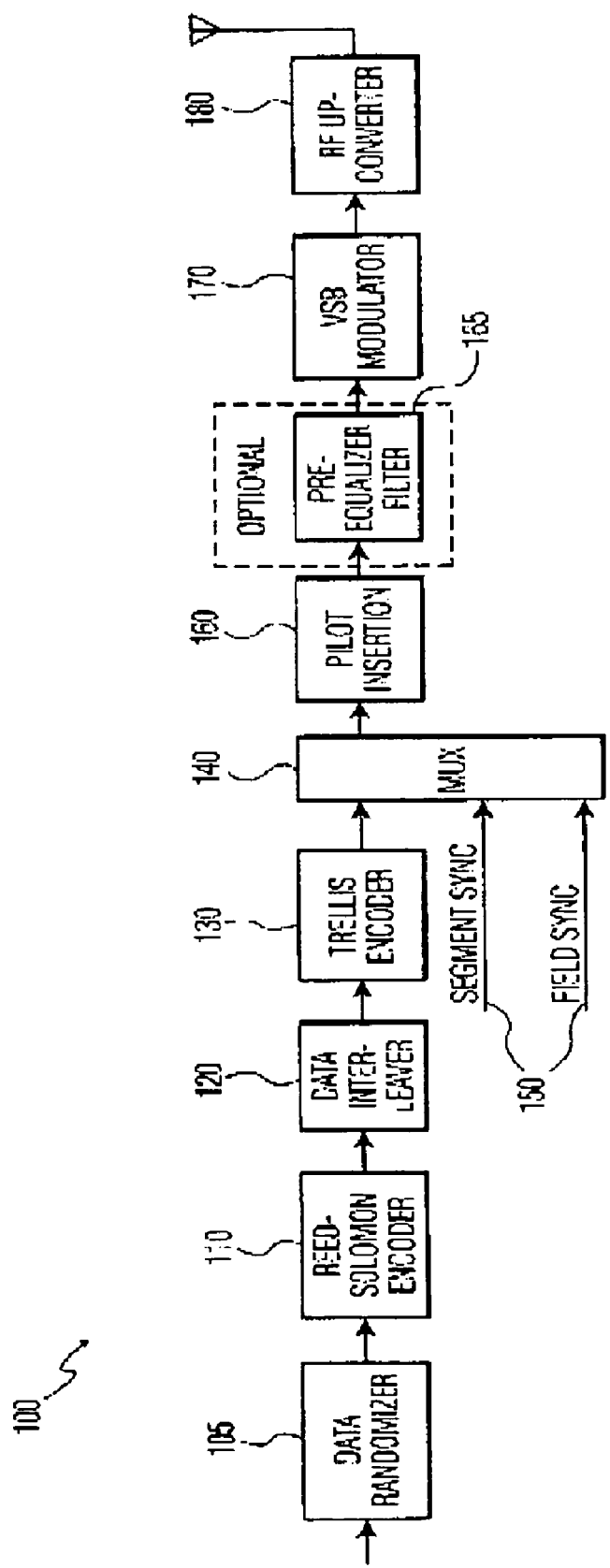
FIG. 1 illustrates a block diagram of an exemplary high definition television (HDTV) transmitter according to the prior art.
Figure 2:
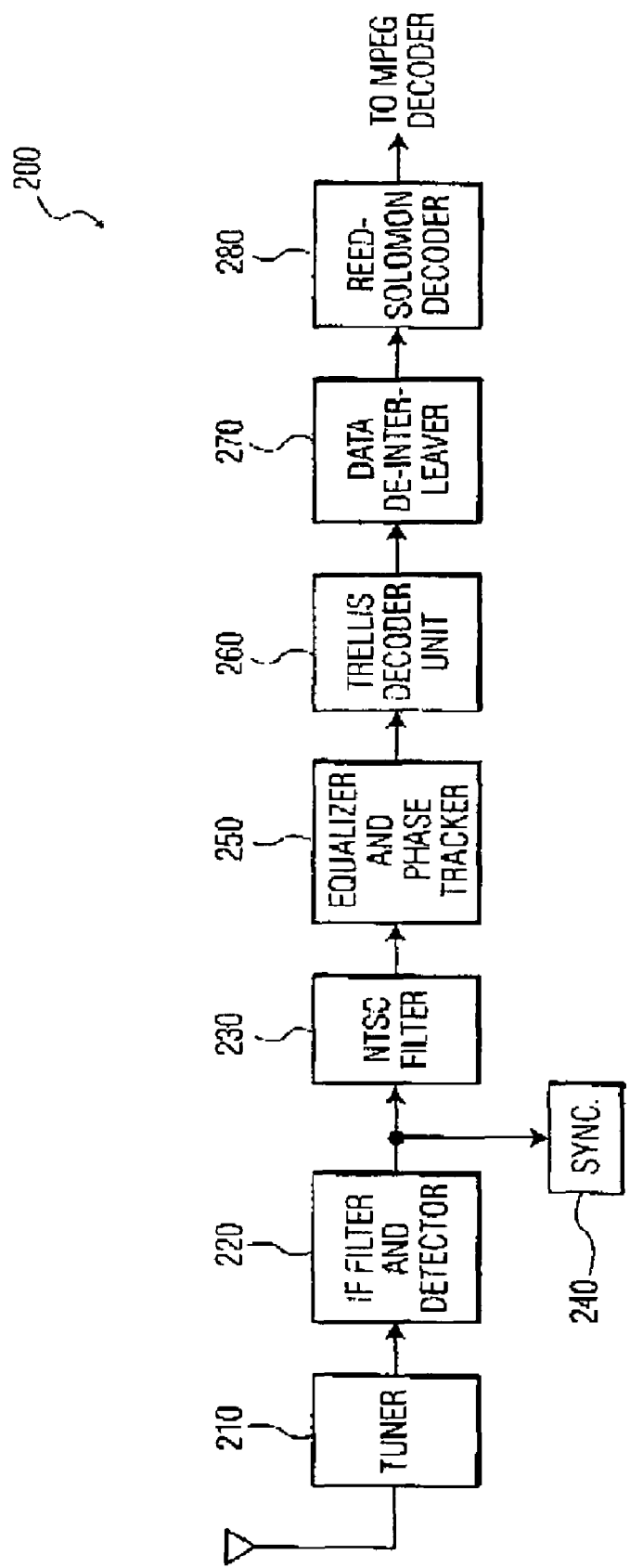
FIG. 2 illustrates a block diagram of an exemplary high definition television (HDTV) receiver according to the prior art.

Referring back to FIG. 3, as the receiver needs MODE, NRS, NRP and RPP information in order for it to properly decode both the bit-streams, the parameters themselves have to be robustly encoded so that they can be decoded even in severe multi-path channels. The encode sync header block 360 performs this function and, after encoding, the encode sync header block 360 places the encoded code-word in a fixed location (reserved bits) in the Frame Sync segment 370. These control parameters are extracted from the detected frame synch signal at the receiver device. The output of the trellis encoder 350, and frame synch signal 370 including the encoded control parameters is then multiplexed by multiplexor unit 365 to form a multiplexed signal 380 which is subject to the pilot insertion and RF up-conversion (FIG. 1).

Figure 10:
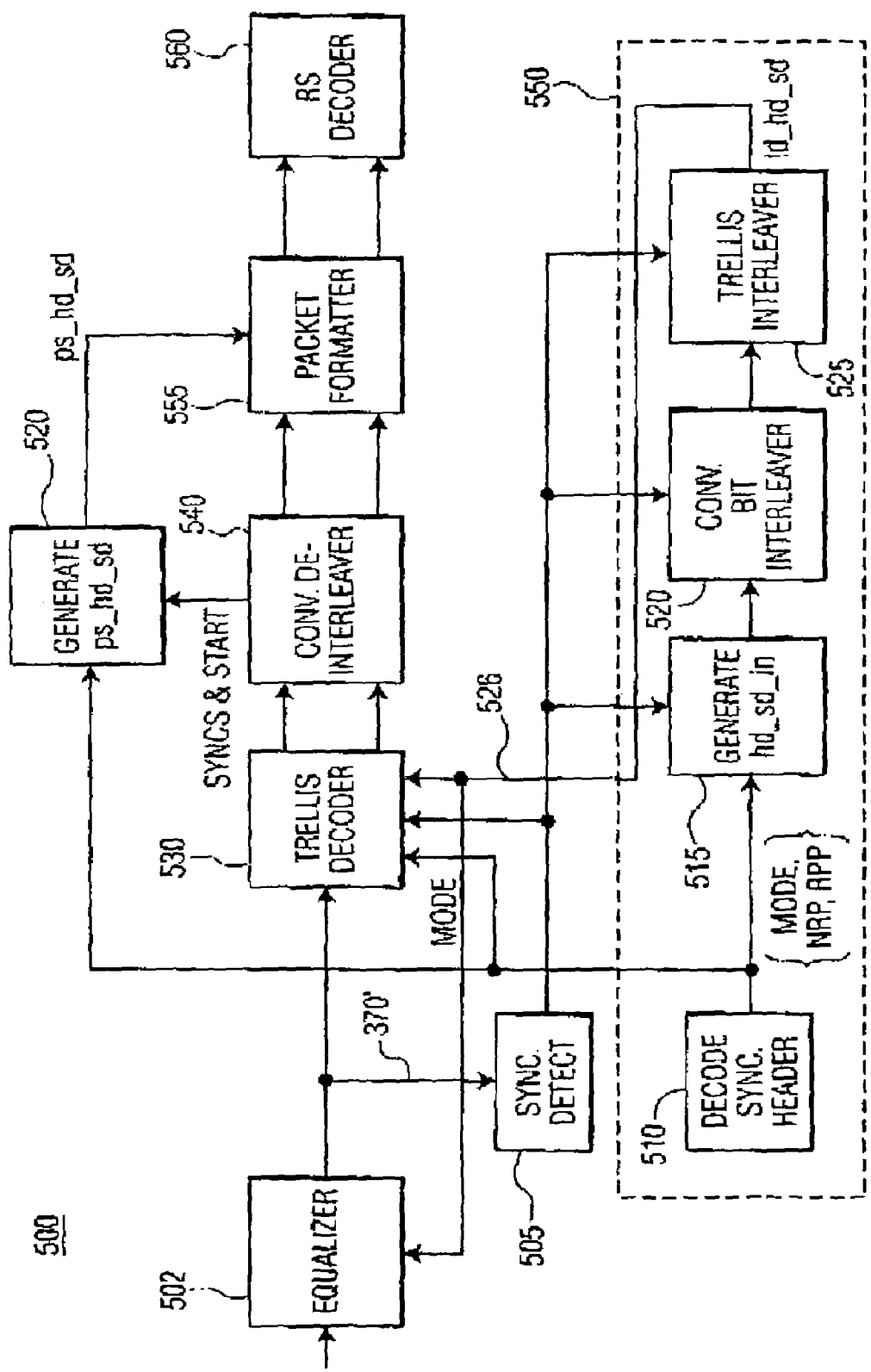

FIG. 10 illustrates a block diagram of a novel ATSC receiver 500 capable of decoding both the standard and new (robust) bit-streams. The embodiment of the receiver 500 depicted in FIG. 10 exemplifies the case when non-systematic RS encoder is not used, i.e., the control parameter NRS=0. As in the transmission system of FIG. 3, the receiver device 500 is provided for decoding the two types of bit streams and, particularly employs an extensive control mechanism 550 to properly track the symbols (bytes) belonging to the two symbol streams. It also implements a packet formatter to reformat the new (robust) NS packets.

As shown in FIG. 10, after carrier demodulation and received signal equalization 502 are performed, a sync detect block 505 detects the frame sync signal present in the received signal 370' that includes the encoded control parameter information associated with the received packets. A Decode sync header block 510 is provided to decode the Frame Sync header information and extract the MODE, NRS, NRP and RPP control parameters. These parameters are then sent to a 'Generate hd_sd_in' block 515 and 'Generate ps_hd_sd' block 520. Particularly, as shown in FIG. 10, the Generate 'hd_sd_in' block 515 generates control information at packet level based on MODE, NRP and RPP parameters. For example, the output of this block is equal to '1' if the packet belongs to NS (new stream) and is equal to '0' if the packet belongs to SS (standard stream). This block only starts when a back-end lock (not shown) is obtained. The Generate 'ps_hd_sd' block 520 is similar to the Generate 'hd_sd_in' block 515 except that it is synchronized with the de-interleaver output sync and start up signals when the de-interleaver output start signal (not shown) toggles high. The Convolutional bit interleaver block 520 is similar to convolutional byte interleaver specified in the ATSC standard, except that the memory element is 1 bit instead of 1 byte. This block 520 is used to track bytes through the convolutional de-interleaver 540. Likewise, the Trellis interleaver block 525 implements the 12-symbol trellis interleaver. The output of this block 'td_hd_sd' signal 526 will be greater than 0 (e.g., 1 for H-VSB, 2 for 4-VSB or 3 for pseudo 2-VSB) when the trellis decoder input symbol (or equalizer output symbol) 390 belongs to NS and is equal to 0 when the trellis decoder input symbol 390 belongs to SS. Functionally, the blocks 515, 520 and 525 in the receiver are similar to the corresponding blocks 315, 341 and 345 in the transmitter. The equalizer 502 additionally uses this signal 526 to get a better estimate of the symbol and the trellis decoder 530 uses this signal in metric calculation. The Packet Formatter block 555 reformats the robust bit-stream packets. When NRS=0, it transforms two NS packets into one packet for input to the RS decoder block 560.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A transmission system comprising:
    a first encoder that encodes an input signal into a stream of packets;
    a packet formatter that is configured to receive the stream of packets and a stream of mode commands to produce a formatted stream of packets, wherein:
    each mode command indicates an encoding mode associated with at least one packet of the stream of packets, wherein:
    in a first encoding mode, the packet formatter formats the packets in a standard form in the formatted stream, and in a second encoding mode, the packet formatter formats the packets in a robust form in the formatted stream, the robust form providing a greater error correcting capacity than the standard form;
    a second encoder that is configured to encode the formatted stream of packets to produce an encoded output stream;
    a multiplexer that is configured to combine the encoded output stream and indicators of the mode command associated with the formatted stream of packets in the encoded output stream; and
    a transmitter that is configured to transmit the encoded output stream.

2. The system of claim 1, wherein the first encoder includes a forward error correcting encoder.

3. The system of claim 2, wherein the forward error encoder includes a Reed-Solomon encoder.

4. The system of claim 2, including a randomizer that randomizes an input to provide the input signal to the first encoder.

5. The system of claim 1, wherein the second encoder includes a Trellis encoder.

6. The system of claim 5, wherein the second encoder includes a convolution interleaver coupled to an input of the Trellis encoder.

7. The system of claim 6, wherein the formatter is configured to replicate the packets in the robust mode to provide redundant packets to the Trellis encoder.

8. The system of claim 7, wherein the first encoder includes a Reed-Solomon encoder.

9. The system of claim 6, wherein the second encoder includes a non-standard Reed-Solomon encoder, and the multiplexer is configured to include an indication of use of the non-systematic Reed-Solomon encoder in the encoded output stream.

10. The system of claim 1, wherein the robust form selectively includes a 2-VSB symbol modulation scheme and a 4-VSB symbol modulation scheme, and the multiplexer is configured to include an indication of the modulation scheme that is selected in the encoded output stream.

11. The system of claim 1, wherein the packets are encoded as frames, and the multiplexer is configured to include an indication of a defined number of packets per frame in the encoded output stream.

12. A receiving system comprising:
    a first decoder that is configured to decode a received signal to provide a decoded stream of packets;
    a packet formatter that is configured to receive the decoded stream of packets and indications or a mode associated with each packet to provide a formatted output stream, wherein, based on the indications of the mode:
    in a first mode, the packet is formatted using a standard form, and
    in a second mode, the packet is formatted using a robust form, the robust form providing a greater error correcting capacity than the standard form;
    a second decoder that is configured to decode the formatted output stream to form an output of the receiving system, wherein the received signal includes an indication of whether the received signal includes non-systematic Reed-Solomon encoding, and the first decoder is configured to decode the non-systematic Reed-Solomon encoding based on the indication.

13. The system of claim 12, wherein in the robust form, the formatted output stream includes redundant packets.

14. The system of claim 12, wherein the first decoder includes a trellis decoder.

15. The system of claim 14, wherein the second decoder includes a Reed-Soloman decoder.

16. A receiving system comprising:
    a first decoder that is configured to decode a received signal to provide a decoded stream of packets;
    a packet formatter that is configured to receive the decoded stream of packets and indications of a mode associated with each packet to provide a formatted output stream, wherein, based on the indications of the mode:
    in a first mode, the packet is formatted using a standard form, and
    in a second mode, the packet is formatted using a robust form, the robust form providing a greater error correcting capacity than the standard form;
    a second decoder that is configured to decode the formatted output stream to form an output of the receiving system, wherein the received signal includes an indication of whether the received signal includes a 2-VSB symbol modulation scheme or a 4-VSB symbol modulation scheme, and the decoder is configured to selectively provide 2-VSB decoding and 4-VSB decoding based on the indication.

17. The system of claim 16, wherein in the robust form, the formatted output stream includes redundant packets.

18. The system of claim 16, wherein the first decoder includes a trellis decoder.

19. The system of claim 18, wherein the second decoder includes a Reed-Soloman decoder.

20. A receiving system comprising:
a first decoder that is configured to decode a received signal to provide a decoded streak of packets;
a packet formatter that is configured to receive the decoded stream of packets and indications or a mode associated with each packet to provide a formatted output stream, wherein, based on the indications of the mode:
in a first mode, the packet is formatted using a standard form, and
in a second mode, the packet is formatted using a robust form, the robust form providing a greater error correcting capacity than the standard form;
a second decoder that is configured to decode the formatted output stream to form an output of the receiving system, wherein the receiving system is configured to process the received signal as a series of frames, and the received signal includes an indication of a defined number of packets per frame in the received signal.

21. The system of claim 20, wherein in the robust form, the formatted output stream includes redundant packets.

22. The system of claim 20, wherein the first decoder includes a trellis decoder.

23. The system of claim 22, wherein the second decoder includes a Reed-Soloman decoder.

24. A method configured for embodiment on a machine, comprising:
encoding an input signal into a stream of packets;
receiving a stream of mode commands for formatting the stream of packets;
formatting the stream of packets based on the mode commands to produce a formatted stream of packets, wherein:
each mode command indicates an encoding mode associated with at least one packet of the stream of packets, and:
in a first encoding mode, formatting the packets in a standard form in the formatted stream, and
in a second encoding mode, formatting the packets in a robust form in the formatted stream, the robust form providing a greater error correcting capacity than the standard form;
encoding the formatted stream of packets to produce an encoded output stream; and
combining the encoded output stream and indicators of the mode commands associated with the formatted stream of packets in the encoded output stream to produce a transmit stream.

25. The method of claim 24, wherein encoding the input stream includes encoding the input stream using a forward error correcting code, and encoding the formatted stream includes a Trellis encoding.

26. The method of claim 25, wherein the formatting in the robust form includes replicating the packets to provide redundant packets to the Trellis encoder.

27. The method of claim 24, wherein encoding the formatted stream includes a non-standard Reed-Solomon encoding, and the transmit stream includes an indication of use of the non-systematic Reed-Solomon encoder in the encoded output stream.

28. The method of claim 24, wherein the robust form selectively includes a 2-VSB symbol modulation scheme and a 4-VSB symbol modulation scheme, and the transmit stream includes an indication of the modulation scheme that is selected in the encoded output stream.

* * * * *